(12) United States Patent
Hubner

(10) Patent No.: US 8,504,614 B2
(45) Date of Patent: Aug. 6, 2013

(54) SYSTEMS AND METHODS FOR VERIFICATION OF IP DEVICE LOCATION

(75) Inventor: Paul V. Hubner, McKinney, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1373 days.

(21) Appl. No.: 11/769,975

(22) Filed: Jun. 28, 2007

(65) Prior Publication Data

US 2009/0003314 A1  Jan. 1, 2009

(51) Int. Cl.
- G06F 15/16 (2006.01)
- H04M 11/04 (2006.01)
- H04W 24/00 (2009.01)

(52) U.S. Cl.
USPC ............ 709/204; 455/404.2; 455/456.1

(58) Field of Classification Search
USPC ............ 709/204; 455/404.2, 456.1–456.6
See application file for complete search history.

(56) References Cited

U.S. PATENT DOCUMENTS

| | | | |
|---|---|---|---|
| 6,782,264 B2* | 8/2004 | Anderson | 455/456.1 |
| 6,940,950 B2 | 9/2005 | Dickinson | |
| 7,027,564 B2 | 4/2006 | James | |
| 7,079,627 B2 | 7/2006 | Crago | |
| 2004/0058689 A1* | 3/2004 | Muhonen et al. | 455/456.1 |
| 2004/0162052 A1* | 8/2004 | Jang et al. | 455/404.2 |
| 2004/0203879 A1* | 10/2004 | Gardner et al. | 455/456.1 |
| 2005/0124316 A1* | 6/2005 | Islam et al. | 455/404.2 |
| 2006/0014517 A1* | 1/2006 | Barclay et al. | 455/404.2 |
| 2006/0094415 A1* | 5/2006 | Veron | 455/419 |
| 2006/0258376 A1* | 11/2006 | Ewell | 455/456.6 |
| 2007/0171854 A1* | 7/2007 | Chen et al. | 370/328 |
| 2008/0200143 A1* | 8/2008 | Qiu et al. | 455/404.2 |
| 2008/0304487 A1* | 12/2008 | Kotecha | 370/392 |
| 2009/0003312 A1* | 1/2009 | Velazquez et al. | 370/352 |
| 2010/0177671 A1* | 7/2010 | Qiu et al. | 370/310 |
| 2010/0197351 A1* | 8/2010 | Ewell et al. | 455/565 |

* cited by examiner

Primary Examiner — Joseph Avellino
Assistant Examiner — James Conaway

(57) ABSTRACT

This application discloses systems and methods for associating the geographic location of VoIP devices and monitoring and updating these locations such that emergency personnel can be directed to a caller's location based on the stored geographic-location information.

20 Claims, 6 Drawing Sheets

Off-Cycle Call or Session Request: Location Not Confirmed

SYSTEMS AND METHODS FOR VERIFICATION OF IP DEVICE LOCATION

BACKGROUND

As the Internet increased in popularity, the number of Internet services and devices exploded. One such service is using the Internet to place voice calls via the Voice over Internet Protocol (VoIP). VoIP has the potential to revolutionize the world's phone systems by merging phone systems with high-speed Internet connections. One can now place voice calls via the Internet using a computer, IP phone, regular phone with an adapter, or any other VoIP device. In fact, many major telephone carriers now provide residential and commercial voice services using VoIP technology. VoIP provides extreme flexibility. For example, business travelers can take their phones with them on trips and always have access to their business phone wherever there is an Internet connection.

However, the possibilities provided by VoIP do present challenges. One such challenge is emergency 911 calls. Because VoIP does not use the North American Numbering Plan (NANP), which associates a phone number with a physical address, there is no way to associate a VoIP device's location with a specific geographic area based on a phone number. Thus, if one were to call 911 and be unable to provide his location, the 911 call center would not have any way to route the appropriate emergency personnel to the caller's location. Notwithstanding this and other shortcomings, consumers are continuing to migrate toward VoIP services because of their low cost. This migration has the potential to leave a substantial number of people without adequate access to emergency services. Thus, there is a need to associate a geographic location with each VoIP device and to monitor and update these locations such that emergency personnel can be directed to a caller's location.

DETAILED DESCRIPTION

Figure 1:
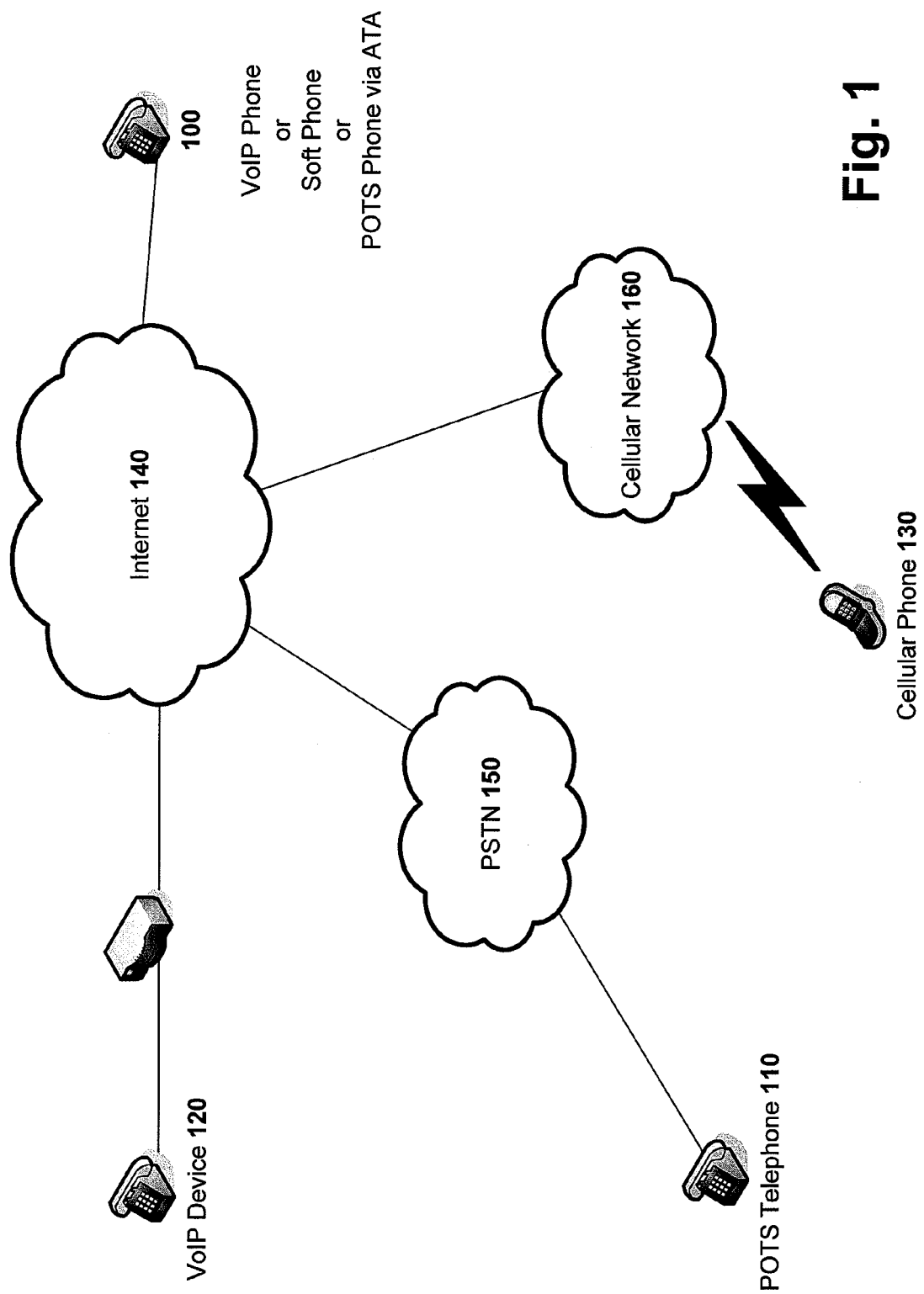
FIG. 1 illustrates an overview of exemplary networks to which VoIP devices connect.

The preferred embodiments will now be described hereinafter with reference to the accompanying drawings, in which exemplary embodiments and examples are shown. Like numbers refer to like elements throughout.

As should be appreciated, the exemplary embodiments may be implemented as a method, a data processing system, or a computer program product. Accordingly, the exemplary embodiments may take the form of an entirely hardware embodiment, an entirely software embodiment, or an embodiment combining software and hardware aspects. Furthermore, the various implementations may take the form of a computer program product on a computer-readable storage medium having computer-readable program instructions (e.g., computer software) embodied in the storage medium. More particularly, implementations of the exemplary embodiments may take the form of web-implemented computer software. Any suitable computer-readable storage medium may be utilized including hard disks, CD-ROMs, optical storage devices, or magnetic storage devices.

The exemplary embodiments are described below with reference to block diagrams and flowchart illustrations of methods, apparatuses (i.e., systems), and computer program products according to an exemplary embodiment. It should be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 provides an overview of exemplary networks to which devices using VoIP may connect. The VoIP devices 100, 120 connect to the networks to make voice calls using the IP protocol. Although FIG. 1 depicts telephones as the VoIP devices 100, 120, the embodiments are not limited to telephones in the traditional sense. In fact, any VoIP device 100, 120 can be used to implement the systems, apparatuses, methods, and computer program products herein described. More generally, the term "VoIP device" 120 can be directed to a cellular phone, PDA, handheld device, computer, laptop, POTS telephone, mainframe, processing device embodied within another apparatus, receiver, transmitter, server, or any other device capable of performing the functions described herein. These devices typically communicate with external communication networks using a communications controller. The external communication networks may interface with the communications controller using a wired data transmission protocol such as X.25, ISDN, DSL, PIP, Ethernet, ATM, frame relay, DOCSIS, or any other wired transmission protocol. Similarly, the devices may be configured to communicate via wireless external communication networks using a wireless protocol such as 802.11, 802.15.4, standard 3G, CDMA2000 1x EV-DO, GPRS, W-CDMA, or any other wireless protocol. In one embodiment, the VoIP devices 100, 120 communicate with a system 170 that is configured to associate the geographic location of each VoIP device 100, 120 such that emergency personnel can be directed to a caller's location based on the information stored by the system 170 about the VoIP device's location. In a broad sense, one embodiment of the system 170 includes a registration server 210, a presence server 220, a proxy watcher 200, and an auto attendant 250.

Each of the registration server 210, presence server 220, proxy watcher 200, and auto attendant 250 typically includes a processor that communicates with memory that may store or function as a database. In one embodiment, the memory can be considered primary memory that is RAM or other forms which retain the contents only during operation, or it may be non-volatile, such as ROM, EPROM, EEPROM, FLASH, or other types of memory that retain the memory contents at all times. The memory could also be secondary memory, such as disk storage, that stores large amounts of data. The secondary memory may be a floppy disk, hard disk, compact disk, DVD, or any other type of mass storage. The processor of each also communicates with external devices via external and internal communications networks in the ways as previously discussed. Each of the registration server 210, presence server 220, proxy watcher 200, and auto attendant 250 also contains memory.

The registration server 210, presence server 220, proxy watcher 200, and auto attendant 250 may reside on a single computer system, be executed via a distributed computer system, be executed as a separate modules within a system, or as separate systems (in fact, each may implemented separately from an existing system to minimize the load on the existing servers), be separate devices, or may be integrated or co-located devices. For example, they may consist of a network of clients and servers connected in such a way that the system communicates with various other systems. Moreover, these clients and servers might be in geographically diverse areas connected by LAN, MAN, or WAN links. Additionally, the embodiments are not limited to one registration server 210, one presence server 220, one proxy watcher 200, or one auto attendant 250; rather, more than one of each may be used within the scope of the various embodiments. Alternatively, the registration server 210, the presence server 220, the proxy watcher 200, and the auto attendant 250 may be executed as modules within a single system such as a registration server module, presence server module, proxy watcher module, and an auto attendant module or as a methods In one embodiment, each VoIP device 120 is required to initially register and periodically reregister with the registration server 210 before being allowed to complete voice calls. After the initial registration, each VoIP device 120 is also required to periodically reregister with the registration server 210. In one embodiment, each VoIP device 120 must reregister every 3,600 seconds, i.e., every hour. As discussed below in greater detail, registering and reregistering may involve identifying the VoIP device 120 (via the IP address, user information, MAC address, or any other identifying information) and establishing a registration or re-registration time. In another embodiment after registering, the user may also be directed to the auto-attendant to provide the geographic-location information. In some embodiments, the geographic-location information is not provided immediately subsequent to the initial registration because many of the VoIP devices 100, 120 can register automatically without user interaction. In one embodiment, the registration server 210 stores the latest registration information for each registered VoIP device 120. This is done via a database storing the latest registration credentials and the time each record was updated. All of the registration information, however, is not necessarily in a single record. Rather, various databases can be used. Thus, the registration credentials can be stored in various field locations in several different records from more than one database. In sum, the registration server 210 registers each VoIP device 100, 120 with the system 170. Additionally, the registration server 210 also provides a copy of the registration information to the presence server 220.

The presence server 220 uses its copy of the registration information to perform checks of the registration cycles for each VoIP device 120. That is, the presence server 220 determines if each device is off-cycle, on-cycle, or a new registration. If a VoIP device 120 is on-cycle, it means that sessions and calls are allowed because the information regarding the VoIP device's 120 geographic location is up-to-date. If the VoIP device 120 is off-cycle, sessions and calls are not initially allowed since off-cycle indicates that the VoIP device's 120 geographic location needs to be updated. A new registration indicates that it is the VoIP device's 120 initial registration with the system 170. A new registration can arise for several reasons including the device having never been registered before or a device restart. A device restart can be caused by accidents (e.g., dislodging the power supply), nature (e.g., thunderstorms or power outages), or intentional acts (e.g., relocating the device to the other side of the desk or taking the phone on a business trip). The cycle period is a time in which each VoIP device 120 must reregister the VoIP device 120. For example, in one embodiment, each VoIP device 120 must reregister every 3,600 seconds, i.e., every hour. In this embodiment, if the VoIP device 120 does not reregister or update every hour, it will be considered as being off-cycle and calls will not be allowed from the device. In some embodiments, the cycle time is based on a variance threshold, e.g., +3 or −3 minutes, to accommodate for clock differences, congestion, and retries in the system 170 or in the network. As such, the VoIP device 120 of this embodiment would be required to reregister in a window from 3,420 seconds to 3,780 seconds from the prior registration. Furthermore, the VoIP device 120 could update more frequently with there being a maximum time in which the geographic-location information must be submitted or confirmed to remain on-cycle. With respect to the updated information, the registration server 210 notifies the presence server 220 with real-time updates of each VoIP device's 120 registration information. In addition to receiving information from the registration server 210, the presence server 220 may also receive registration information updates from the gateway 230 and the auto attendant 250. As mentioned, the presence server 220 uses this registration information to determine if each registered VoIP device 120 is off-cycle, on-cycle, or a new registration and in turn communicates this information to the proxy watcher 200.

The proxy watcher 200 uses the off-cycle, on-cycle, and new registration information in determining whether to allow calls or redirect them to the auto attendant 250 for verification of the geographic-location information, i.e., the proxy watcher 200 flags the VoIP devices 100, 120 that require forwarding to the auto attendant 250. For example, in one embodiment, the proxy watcher 200 is part of the inline logical path for VoIP session or call requests. When a VoIP device 120 makes a session or call request, the proxy watcher 200 either allows the session or call to be established (indicating the VoIP device 120 is on-cycle) or redirects the call to the auto attendant 250 (indicating the VoIP device 120 is off-cycle). Thus, the proxy watcher 200 serves a gate-keeping role in directing traffic from the VoIP device 120 to the registration server 210, the gateway 230, and the auto attendant 250. When the proxy watcher 200 receives a request for a session or call and determines that the VoIP device 120 is off-cycle, the proxy watcher 200 redirects the call to the auto attendant 250.

The auto attendant 250 updates the geographic-location information for each VoIP device 120. In one embodiment, the auto attendant 250 communicates with a customer location database 240 to store and retrieve the geographic-location information associated with each VoIP device 120. The customer location database 240 can be an existing platform currently used for emergency-locating services or one specifically used for implementation with the auto attendant 250. When the proxy watcher 200 redirects the call or session to the auto attendant 250, the auto attendant 250 requests the user to submit or confirm the current geographic-location information of the VoIP device 120. In one embodiment, the auto attendant 250 first queries the customer location database 240 to determine if any geographic-location information is associated with the VoIP device 120. If the customer location database 240 is storing geographic-location information associated with the VoIP device 120, the auto attendant 250 confirms whether the stored information is correct. In one embodiment, the auto attendant 250 uses DTMF (dual-tone multi-frequency) to confirm the geographic-location information stored in the customer location database 240. For instance, "press one if the VoIP device is still located at 123 Main Street," "press two if the VoIP device is no longer located at 123 Main Street," or "press three to disable emergency services locating." Depending on the user's response, additional prompts may be executed or used in combination with voice capture technology to record the VoIP device's 120 location.

In another embodiment, voice capture technology is used to receive the user's responses. For example, the auto attendant 250 communicates "please say the state in which the VoIP device 120 is located," "please say the county in which the VoIP device 120 is located," "please say the city in which the VoIP device 120 is located," "please say the street address at which the VoIP device 120 is located," "thank you." As the user responds to the voice prompts, voice capture technology captures the user's responses and stores them in the customer location database 240. Additionally, the customer location database 240 can store any type of information related to the VoIP device's 120 location, e.g., location not available or current record rejected. In some embodiments, the auto attendant 250 is also configured to repeat the user's responses to verify that the geographic-location information was accurately received. Based on the user's responses, several status permutations are possible. Some exemplary status permutations are provided.

TABLE 1

User confirms the location of the VoIP device 120 has not changed
Normal calling is allowed and a new cycle is established
User confirms the location of the VoIP device 120 has changed and disables the emergency services locating
Normal calling is allowed, but emergency services locating is disabled and a new cycle is established
User confirms the location of the VoIP device 120 has changed and does not provide or update the geographic location information
Normal calling is not allowed TABLE 1-continued User confirms the location of the VoIP device 120 has changed and provides or updates the geographic-location information
Normal calling is allowed, and a new cycle is established After receiving responses from the user, the auto attendant 250 notifies the presence server 220 of the VoIP device's 120 updated status, e.g., instructing the presence server 220 to start a new cycle for the VoIP device 120. In another embodiment, the auto attendant 250 notifies both the registration server 210 and the presence server 220 of the updated information. In either embodiment, the presence server 220 uses this information to change the status of the VoIP device 120 and to also notify the proxy watcher 200 of the changed status. As should be recognized, though, there are other methods of requesting, receiving, storing, submitting, confirming, and updating the geographic-location information associated with each VoIP device 120. That is, the geographic-location information of the exemplary embodiments can be provided in ways other than voice prompts and voice recognition, such as using text or filling out a predefined electronic form. Moreover, as should be recognized, the methods described above are not limited to those described as they are merely exemplary.

In one embodiment, the registration server 210, the presence server 220, the proxy watcher 200, and the auto attendant 250 communicate using session initiated protocol (SIP). That is, the VoIP device 120 uses the SIP protocol to register with the registration server 210 as being available for call completions and originations. However, as should be recognized, various messaging protocols can be used within the scope of the various embodiments.

Figure 2:
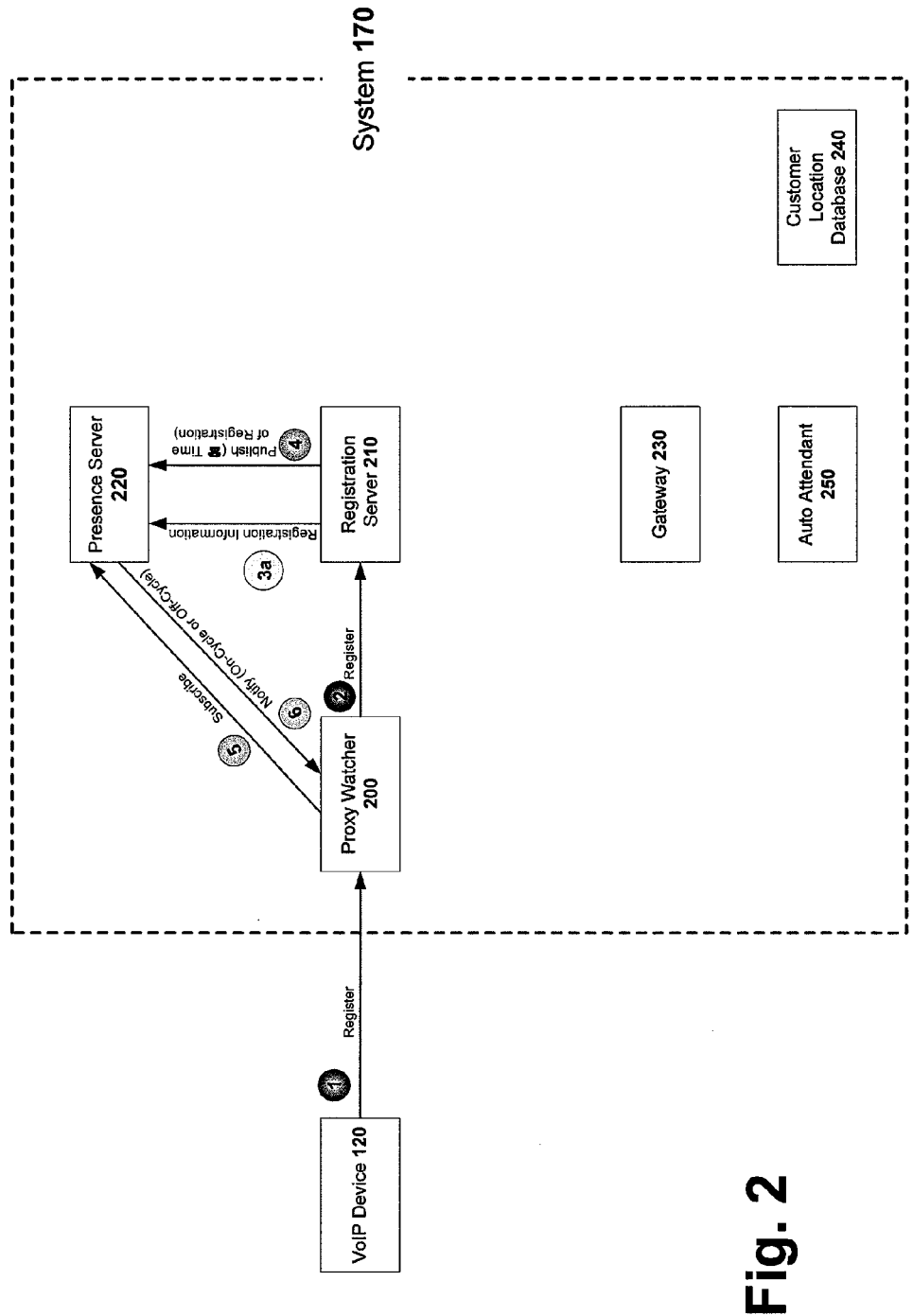
FIG. 2 shows one embodiment of the registration process which does not use the auto attendant.

FIG. 2 shows one embodiment of registering a VoIP device 120. In this example, there is no communication with the auto attendant 250 in the registration process. This is because many VoIP devices 100, 120 are configured to automatically register the device with no user involvement. This registration is not always complete, though. For instance, the VoIP device 120 might only provide information about the device itself without providing information regarding its geographic location. In such instances, the user typically provides the geographic-location information when the initial call is placed. That is, the VoIP device 120 registers itself with the system 170, and the registration server 210 indicates the VoIP device 120 as being off-cycle so the user will be required to provide the geographic-location information when initiating the first session or call request.

In step 1 as shown in FIG. 2, the VoIP device 120 initiates a registration request. The proxy watcher 200 receives the request and forwards it on to the registration server 210 (step 2). After registering the VoIP device 120, the registration server 210 forwards on both the registration information and the time of registration to the presence server 220 (steps 3 and 4). In the various embodiments, steps 3 and 4 can be performed in a single step or in separate steps. Also, in addition to receiving information from the registration server 210, the presence server 220 receives a subscribe request from the proxy watcher 200. The subscribe request involves the proxy watcher 200 requesting information regarding the VoIP device's 120 cycle information, i.e., off-cycle, on-cycle, or a new registration (step 5). After receiving the registration information (steps 3 and 4) and the subscribe request (step 5), the presence server 220 provides the proxy watcher 200 with the VoIP device's 120 cycle information (step 6). In another embodiment, however, the proxy watcher 200 does not send a subscribe request to the presence server 220; instead, the presence server 220 automatically forwards the cycle information to the proxy watcher 200. The cycle information indicates whether the device is on-cycle, off-cycle, or a new registration. Thus, by receiving the cycle information, the proxy watcher 200 knows how to handle a call or session request from each VoIP device 120, i.e., it knows to allow the call or redirect it to the auto attendant 250. For example, if the VoIP device 120 is on-cycle, the proxy watcher 200 will allow the call or session. If the VoIP device 120 is off-cycle, the proxy watcher 200 will redirect the call or session to the auto attendant 250. And if the VoIP device 120 is a new registration and the geographic-location information is provided, the proxy watcher 200 will allow the call or session request.

Figure 3:
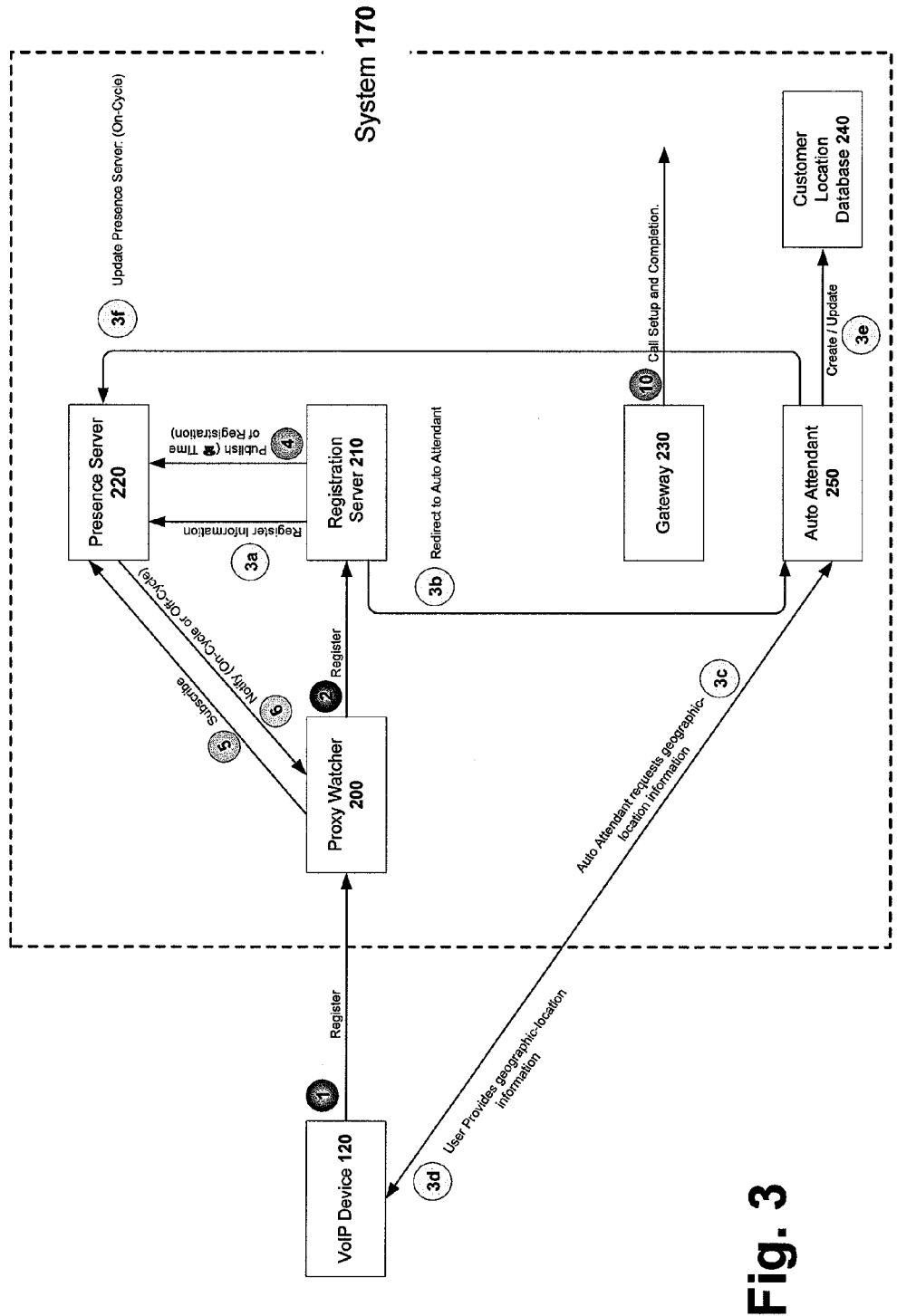
FIG. 3 shows one embodiment of the registration process using the auto attendant.

In another embodiment, shown in FIG. 3, registering may involve communication with the auto attendant 250 to submit the VoIP device's 120 geographic-location information. In this embodiment, registration often occurs simultaneously with the initial call or session request. This step can occur, though, before the initial call or session request such as in a true registration step executed by the user. In either scenario, the user submits the geographic-location information for the VoIP device 120 via the auto attendant 250, and the system 170 connects the call.

In a pure registration step executed by the user, the VoIP device 120 initiates a registration request (step 1). The proxy watcher 200 receives the request and forwards it on to the registration server 210 (step 2). The registration server 210 registers the VoIP device 120 by executing several steps. First, the registration server 210 provides the registration information to the presence server 220 (step 3a). Next, the registration server 210 redirects the call or session request to the auto attendant 250 (step 3b). The auto attendant 250 requests the geographic-location information from the user via the VoIP device 120 (3c); the user's responds in step 3d. In step 3e, the auto attendant 250 updates the customer location database 240 with the user's responses. The auto attendant 250 then updates the presence server 220 indicating the VoIP device 120 as being on-cycle (step 3f). In another embodiment, the auto attendant 250 updates the registration server 210, and the registration server 210 updates the presence server 220. In yet another embodiment, the auto attendant 250 updates both the registration server 210 and the presence server 220.

After registering the VoIP device 120, the registration server 210 forwards on both the registration information and the time of registration to the presence server 220 (steps 3a and 4). As mentioned, steps 3a and 4 can be performed in a single step or in separate steps. In addition to receiving information from the registration server 210, the presence server 220 also receives a subscribe request from the proxy watcher 200. The subscribe request involves the proxy watcher 200 requesting information regarding the VoIP device 120. After receiving the registration information (steps 3a and 4) and the subscribe request (step 5), the presence server 220 then provides the proxy watcher 200 with the VoIP device's 120 cycle information (step 6). After the presence server 220 indicates that the VoIP device 120 is on-cycle, the proxy watcher 200 will allow session or call requests during the on-cycle period.

Figure 4:
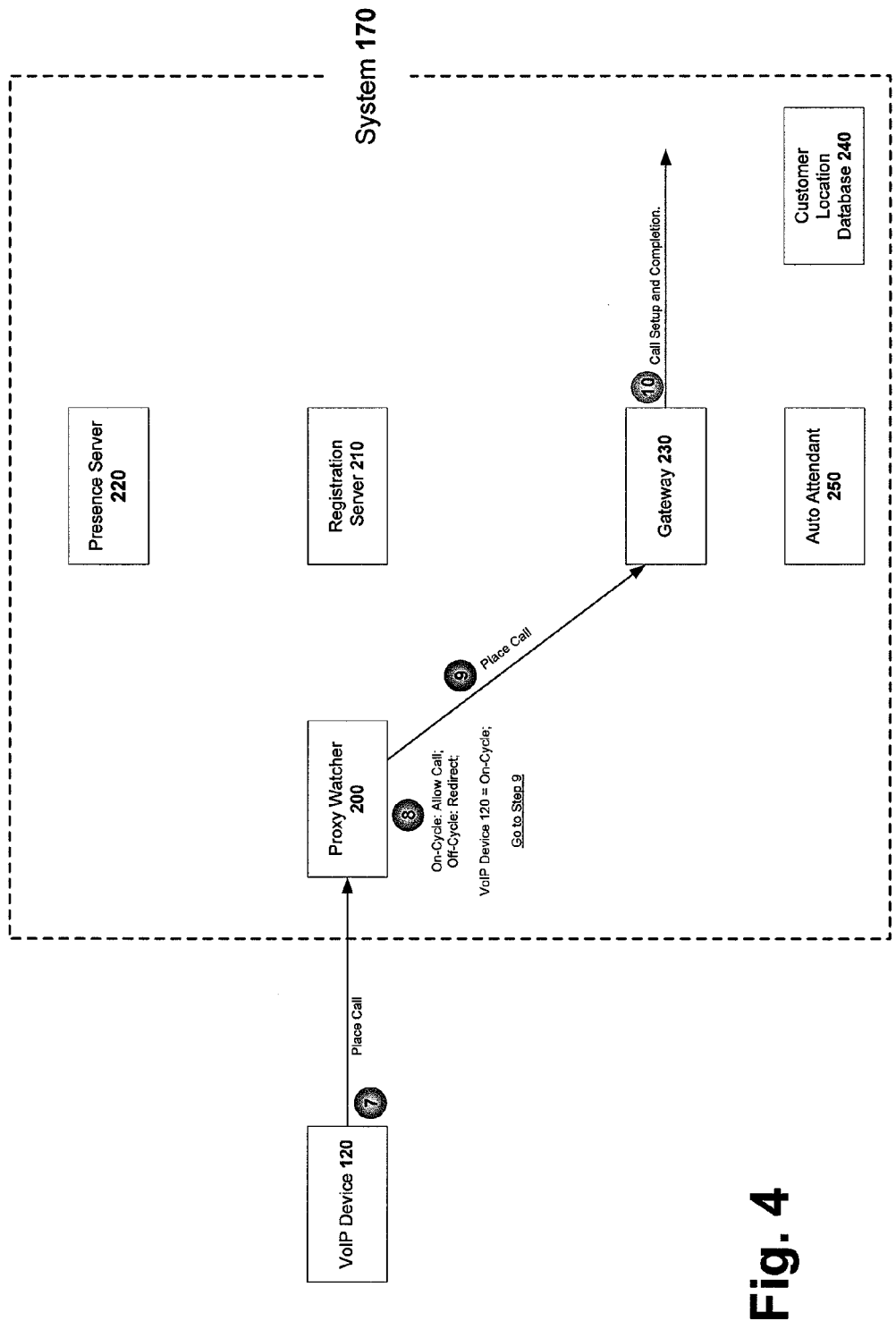
FIG. 4 illustrates one embodiment of a call originating from an on-cycle VoIP device.

FIG. 4 shows an on-cycle call or session request but does not depict the initial registration process as it has already occurred in this embodiment. First, the VoIP device 120 initiates a voice call (step 7). Next, because the VoIP device 120 has previously registered with the system 170 and provided the geographic-location information, the proxy watcher 200 allows the call (step 8). In allowing the call, the proxy watcher 200 forwards the information to the gateway 230 (step 9). Then, the gateway 230 receives the call or session request and executes the call setup and completes the call (step 10). This or a similar process occurs each time a call or session request is initiated when the VoIP device 120 is on-cycle.

Figure 5:
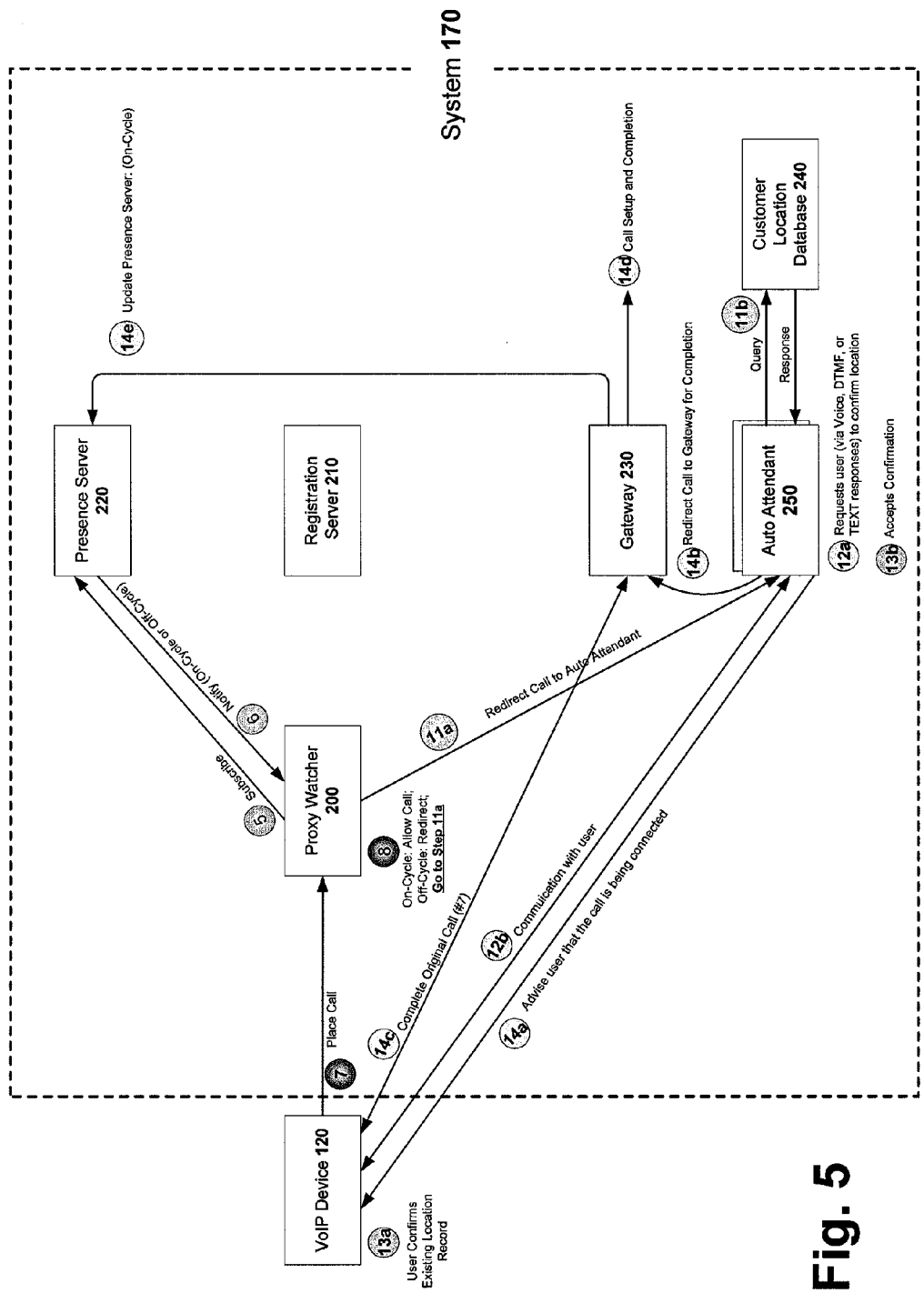
FIG. 5 shows one embodiment of a call originating from an off-cycle VoIP device in which the user confirms the VoIP device's location.
Figure 6:
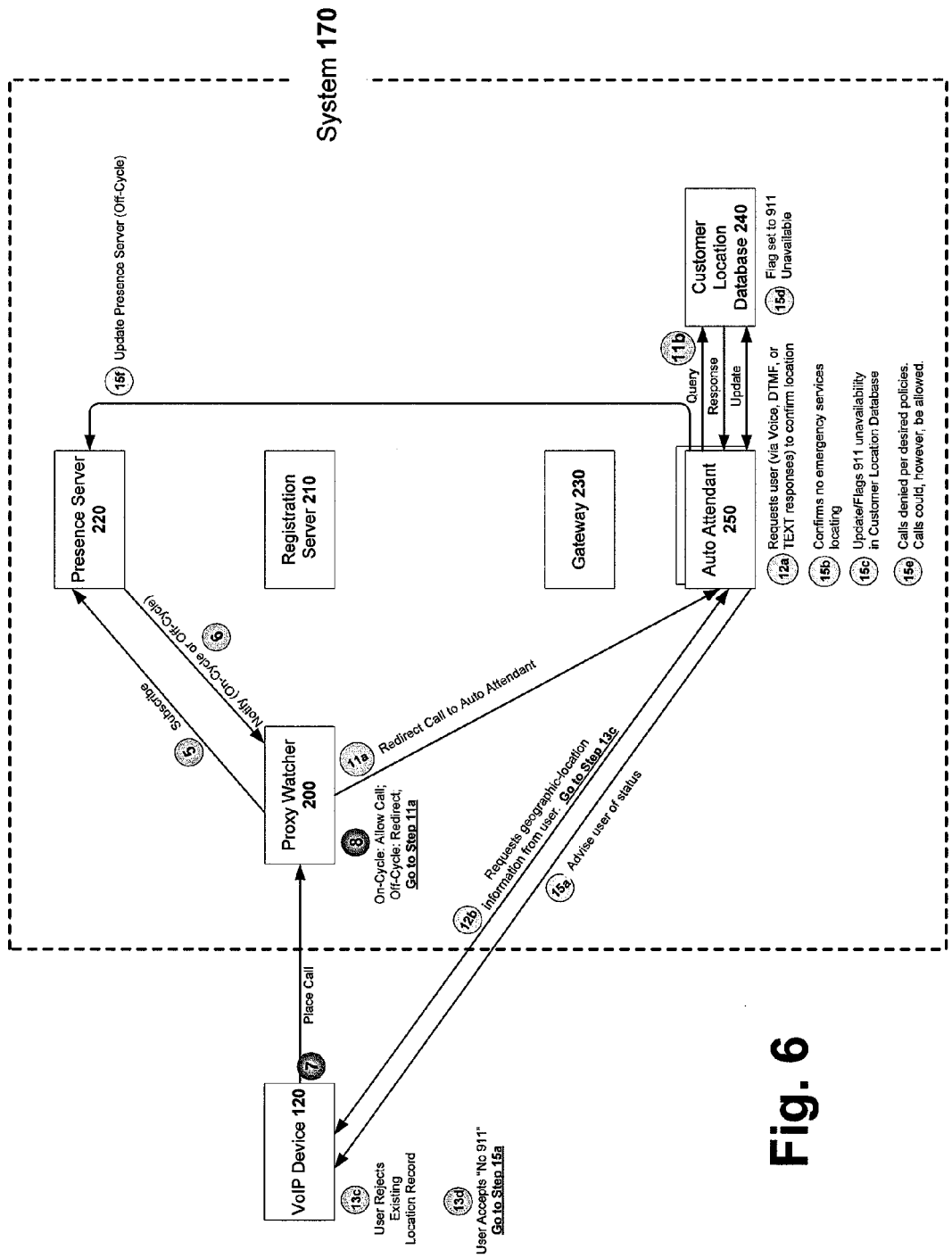
FIG. 6 shows one embodiment of a call originating from an off-cycle VoIP device in which the user does not confirm the VoIP device's location.

Similar to FIG. 4, FIGS. 5 and 6 do not depict the initial registration process as it has already occurred in these embodiments. FIG. 5 shows an off-cycle call or session request in which the user confirms the geographic-location information in the existing location record stored in the customer location database 240. After the VoIP device 120 places the call (step 7), the proxy watcher 200 determines the call needs to be redirected to the auto attendant 250 before it is allowed because the VoIP device 120 is off-cycle (step 8). Thus, the call is redirected to the auto attendant 250 (step 11a). The auto attendant 250 queries the customer location database 240 to request the location record for the VoIP device 120, to which the customer location database 240 responds and provides a copy of the location record (step 11b). In step 12b, the auto attendant 250 requests the user to confirm the location of the VoIP device 120 as indicated in the location record (steps 12a and 12b). For example, the auto attendant 250 might communicate "press one if the VoIP device is still located at 123 Main Street," "press two if the VoIP device is no longer located at 123 Main Street," or "press three to disable emergency services locating." In one embodiment, the user presses one to confirm the existing location record (step 13a). After accepting confirmation of the VoIP device's 120 location (step 13b) using DTMF, the auto attendant 250 advises the user that the call is being connected (step 14a). The auto attendant 250 then redirects the call to the gateway after which the original call request from step 7 is completed (steps 14b and 14c). That is, the gateway 230 performs the call set up and completes the call (step 14d).

FIG. 6 shows an off-cycle call or session request in which the user rejects the geographic-location information in the existing location record stored in the customer location database 240 and disables emergency services locating. After the VoIP device 120 places the call (step 7), the proxy watcher 200 determines the call needs to be redirected to the auto attendant 250 because the VoIP device 120 is off-cycle (step 8). Thus, the call is redirected to the auto attendant 250 (step 11a). The auto attendant 250 queries the customer location database 240 to request the location record for the VoIP device 120, to which the customer location database 240 responds and provides a copy of the location record (step 11b). In steps 12a and 12b, the auto attendant 250 requests the user to confirm the location of the VoIP device 120 as indicated in the location record. For example, "press one if the VoIP device is still located at 123 Main Street," "press two if the VoIP device is no longer located at 123 Main Street," or "press three if the VoIP device is no longer located at 123 Main Street and you wish disable emergency services locating." In one embodiment, the user presses three rejecting the existing location record and disabling emergency services locating (steps 13c and 13d). What occurs next depends on the predefined policies. The system 170 of one embodiment stores a set of predefined policies for certain user responses. The predefined policies determine how the auto attendant 250 will respond to the user's rejection.

For instance, based on a set of predefined policies, the auto attendant 250 may initiate several actions, two of which include allowing the call with disabled emergency services locating or denying outgoing calls until the VoIP device's 120 geographic-location information is provided. As should be recognized, the various embodiments can initiate numerous actions in response to the various user responses. In this embodiment, the auto attendant 250 advises the user of the call status, denies the call based on the predefined policies, updates the customer location database 240 to reflect that the stored geographic location was rejected by the user, and notifies the presence server 220 that the VoIP device 120 is off-cycle (steps 15a, 15b, 15c, 15d, 15e, and 15f). In turn, the presence server 220 notifies the proxy watcher 200 that the VoIP device 120 is off-cycle. In other embodiments, the auto attendant 250 notifies both the proxy watcher 200 and the presence server 220 that the VoIP device 120 is off-cycle. As should be recognized, the various embodiments can be represented by numerous permutations of the described steps.

Furthermore, the processes herein described are exemplary and not limiting to the various embodiments described. In other words, as should be recognized, the described steps can be performed in different orders, in combination with other steps, and by different devices.

As previously mentioned, the exemplary embodiments can be implemented as a method, apparatus, data processing system, or computer program product. As illustrated, the various embodiments provide a solution for associating the geographic location of VoIP devices and monitoring and updating these locations such that emergency personnel can be directed to a caller's location based on the VoIP device's location. This provides a solution for identifying the geographic location of devices using VoIP to place voice calls.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

That which is claimed:

1. A method comprising:
   receiving, by at least one processor, a session request from an Internet protocol device;
   determining, by the at least one processor, whether the Internet protocol device is off-cycle or on-cycle based on registration information associated with the Internet protocol device;
   initiating, by the at least one processor and when the Internet protocol device is on-cycle, a session with the Internet protocol device;
   transmitting, by the at least one processor and when the Internet protocol device is off-cycle, a confirmation of location information message to the Internet protocol device;
   receiving, by the at least one processor, a rejection message, based on the confirmation of location information message, from the Internet protocol device,
      the rejection message including first information indicating that the Internet protocol device does not confirm location information in the location information message and second information indicating that the Internet protocol device requests disabling emergency services locating; and
   performing, by the at least one processor and based on receiving the rejection message, one of:
      allowing the session with at least one disabled service, or
      denying the session.

2. The method of claim 1, further comprising:
   receiving, by the at least one processor, a confirmation message, based on the confirmation of location information message, from the Internet protocol device; and
   allowing, by the at least one processor and based on receiving the confirmation message, traffic from and to the Internet protocol device.

3. The method of claim 1, further comprising:
   disabling, by the at least one processor, the emergency services locating when location information for the Internet protocol device is unavailable.

4. The method of claim 1, where the session request is executed via a session initiation protocol.

5. The method of claim 1, further comprising:
   periodically querying, by the at least one processor, the Internet protocol device to determine if the Internet protocol device is off-cycle.

6. The method of claim 1, further comprising:
   receiving, by the at least one processor, one or more periodic self re-registrations from the Internet protocol device.

7. A non-transitory computer-readable medium storing instructions, the instructions comprising:
   one or more instructions which, when executed by a processor, cause the processor to receive a session request from an Internet protocol device;
   one or more instructions which, when executed by the processor, cause the processor to determine if the Internet protocol device is off-cycle or on-cycle based on registration information associated with the Internet protocol device;
   one or more instructions which, when executed by the processor, cause the processor to initiate, when the Internet protocol device is on-cycle, a session with the Internet protocol device;
   one or more instructions which, when executed by the processor, cause the processor to transmit, when the Internet protocol device is off-cycle, a confirmation of location information message, to the Internet protocol device;
   one or more instructions which, when executed by the processor, cause the processor to receive a rejection message, based on the confirmation of location information message, from the Internet protocol device,
      the rejection message including first information indicating that the Internet protocol device does not confirm location information in the location information message and second information indicating that the Internet protocol device requests disabling emergency services locating; and
   one or more instructions which, when executed by the processor, cause the processor to perform an action, the one or more instructions to perform the action including one of:
      one or more instructions to allow the session with at least one disabled service, or
      one or more instructions to deny the session.

8. The medium of claim 7, further comprising:
   one or more instructions which, when executed by the processor, cause the processor to receive a confirmation message, based on the confirmation of location information message, from the Internet protocol device; and
   one or more instructions which, when executed by the processor, cause the processor to allow, based on receiving the confirmation message, traffic from and to the Internet protocol device.

9. The medium of claim 7, further comprising:
   one or more instructions which, when executed by the processor, cause the processor to disable the emergency services locating when location for the Internet protocol device is unavailable.

10. The medium of claim 7, further comprising:
    one or more instructions which, when executed by the processor, cause the processor to receive the session request via a session initiation protocol.

11. The medium of claim 7, further comprising:
one or more instructions which, when executed by the processor, cause the processor to periodically query the Internet protocol device to determine if the Internet protocol device is off-cycle.

12. The medium of claim 7, further comprising:
one or more instructions which, when executed by the processor, cause the processor to receive one or more periodic self re-registrations from the Internet protocol device.

13. An apparatus comprising:
a memory to store a plurality of instructions; and
a processor to execute the plurality of instructions in the memory to:
receive a session request from an Internet protocol device;
determine if the Internet protocol device is off-cycle or on-cycle based on registration information associated with the Internet protocol device;
initiate, when the Internet protocol device is on-cycle, a session with the Internet protocol device;
transmit, when the Internet protocol device is off-cycle, a confirmation of location information message, to the Internet protocol device;
receive a rejection message, based on the confirmation of location information message, from the Internet protocol device,
the rejection message including first information indicating that the Internet protocol device does not confirm location information in the location information message and second information indicating that the Internet protocol device requests disabling emergency services locating; and
perform, based on receiving the rejection message, one of:
allow the session with at least one disabled service, or deny the session.

14. The apparatus of claim 13, where the processor is further to:
receive a confirmation message, based on the confirmation of location information message, from the Internet protocol device; and
allow, based on receiving the confirmation message, traffic from and to the Internet protocol device.

15. The apparatus of claim 13, where the processor is further to:
disable the emergency services locating when location information for the Internet protocol device is unavailable.

16. The apparatus of claim 13, where the processor is further to:
receive the session request via a session initiation protocol.

17. The apparatus of claim 13, where the processor is further to:
periodically query the Internet protocol device to determine if the Internet protocol device is off-cycle.

18. The apparatus of claim 13, where the processor is further to:
receive one or more periodic self re-registrations from the Internet protocol device.

19. The method of claim 1,
where the at least one disabled service is the emergency services locating.

20. The apparatus claim 13, where the at least one disabled service is the emergency services locating.

* * * * *